United States Patent
Wang et al.

(10) Patent No.: US 10,048,807 B2
(45) Date of Patent: Aug. 14, 2018

(54) TOUCH CONTROL DETECTING METHOD AND TOUCH CONTROL DETECTING SYSTEM

(71) Applicant: PixArt Imaging Inc., Hsin-Chu (TW)

(72) Inventors: Guo-Zhen Wang, Hsin-Chu (TW);
Shih-Feng Chen, Hsin-Chu (TW);
Han-Chang Lin, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 15/387,618

(22) Filed: Dec. 21, 2016

(65) Prior Publication Data
US 2017/0322675 A1    Nov. 9, 2017

(30) Foreign Application Priority Data
May 4, 2016    (TW) .............................. 105113818 A

(51) Int. Cl.
*G06F 3/042*    (2006.01)

(52) U.S. Cl.
CPC ................................. *G06F 3/0421* (2013.01)

(58) Field of Classification Search
CPC .... G06F 3/0421; G06F 3/0418; G06F 3/0416; G06F 3/03545; G01H 9/00; H04M 5/378
USPC .......................................................... 345/175
See application file for complete search history.

(56) References Cited

U.S. PATENT DOCUMENTS

| | | | |
|---|---|---|---|
| 9,350,922 B2 * | 5/2016 | Cheng | H04N 5/378 |
| 9,727,160 B2 * | 8/2017 | Gu | G06F 3/0416 |
| 2003/0112220 A1 * | 6/2003 | Yang | G06F 3/03545 345/156 |
| 2005/0052724 A1 * | 3/2005 | Suzuki | G01H 9/00 359/305 |
| 2014/0062961 A1 * | 3/2014 | Kao | G06F 3/0418 345/175 |

* cited by examiner

*Primary Examiner* — Fred Tzeng
(74) *Attorney, Agent, or Firm* — Winston Hsu

(57) ABSTRACT

A touch control detecting method applied to an electronic apparatus comprising an image sensor. The touch control detecting method comprises: (a) capturing a plurality of sensing images via the image sensor; and (b) determining if an object performs a predetermined touch control operation to the electronic apparatus, according to a brightness variation tendency of the sensing images.

12 Claims, 7 Drawing Sheets

TOUCH CONTROL DETECTING METHOD AND TOUCH CONTROL DETECTING SYSTEM

BACKGROUND OF THE INVENTION

1. Field of the Invention

The present invention relates to a touch control detecting method and a touch control detecting system, and particularly relates to a touch control detecting method and a touch control detecting system which can apply a brightness variation tendency of an image to determine a touch control operation.

2. Description of the Prior Art

Recently, a smart electronic apparatus such as a tablet computer becomes more and more popular. Such kind of smart electronic apparatus always applies a capacitive touch control screen as a control interface. However, the capacitive touch control screen is hard to determine some complex operations such as continuous tap. Also, under some circumstances, user's touch control operations are hard to be determined by the capacitive touch control screen. For example, if a user wears a glove to perform a touch control operation to the capacitive touch control screen, the capacitance value of the capacitive touch control screen does not change even if the user touches, since the glove is made from insulation materials. For such case, the capacitive touch control screen cannot determine user's touch control operations.

In order to provide a convenient control interface to a smart electronic apparatus, some manufacturers provide hardware buttons as the control interface of the smart electronic apparatus. FIG. 1 is a schematic diagram illustrating that a hardware button is applied as a control interface in the prior art. As illustrated in FIG. 1, the electronic apparatus 100 comprises a hardware button 101. A user can set the hardware button as a common function button. Such kind of hardware button can be a button fixed on the electronic apparatus 100, or a removable button. However, each kind of buttons has some defects.

For example, if the hardware button 101 is a button fixed to the electronic apparatus 100, the electronic apparatus 100 must provide a region for the hardware button and accordingly has a bigger size. Such bigger size does not meet the requirements for a modern electronic apparatus. If the hardware button 101 is a removable hardware button, the electronic apparatus 100 must have a plug corresponding to the hardware button, like an earphone plug. However, the plug may not perform the function it originally has while the hardware button is set in the plug. The user may lost the hardware button 101 while the hardware button 101 is not set to the plug.

SUMMARY OF THE INVENTION

Therefore, one objective of the present invention is to provide a touch control detecting method which can apply sensing images to determine the touch control operations.

Another objective of the present invention is to provide a touch control detecting system which can apply sensing images to determine the touch control operations.

One embodiment of the present invention disclose a touch control detecting method applied to an electronic apparatus comprising an image sensor. The touch control detecting method comprises: (a) capturing a plurality of sensing images via the image sensor; and (b) determining if an object performs a predetermined touch control operation to the electronic apparatus, according to a brightness variation tendency of the sensing images.

Another embodiment of the present invention discloses a touch control system comprising: an image sensor, configured to capture a plurality of sensing images; and a control unit, configured to determine if an object performs a predetermined touch control operation to a control interface, according to a brightness variation tendency of the sensing images.

In view of above-mentioned embodiments, the sensing images can be applied to determine the touch control operation. Accordingly, the issues due to the capacitive touch control screen or the hard ware button illustrated in prior art can be avoided.

These and other objectives of the present invention will no doubt become obvious to those of ordinary skill in the art after reading the following detailed description of the preferred embodiment that is illustrated in the various figures and drawings.

DETAILED DESCRIPTION

Various embodiments are provided to explain the concept of the present invention. Please note, the system, apparatus or module in following embodiments can be implemented by hardware (ex. circuit), or the combination of hardware and software (ex. a processing unit executing at least one program). Additionally, a finger is applied as an example for the object in the following embodiments. However, please note other objects besides the finger, such as a touch control pen, can be applied for the present invention. Furthermore, in following embodiments, a touch control screen is applied for explaining, but the present invention can be applied to other touch control interfaces (ex. an optical touch control pad).

In following embodiments, an image sensor is applied for capturing a plurality of sensing images, and then the brightness variation tendency of the sensing images is applied to determine if the finger performs a predetermined touch control operation to an electronic apparatus. In one embodiment, the image sensor is always on, such that all touch control operations can be detected, but it does not mean to limit. In one embodiment, the image sensor firstly captures sensing images via a low resolution, and switches to a higher resolution to capture the sensing image if brightness varies, which means a finger is moving closer.

Figure 1:
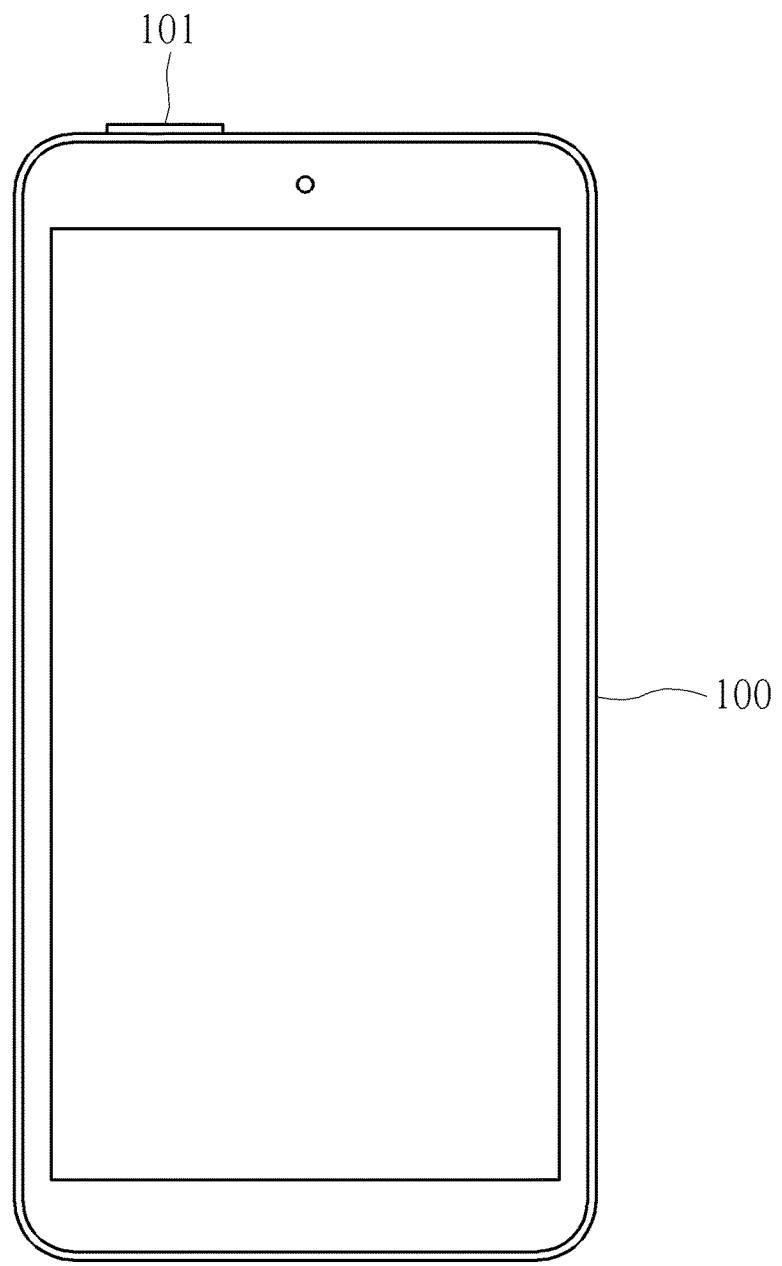
FIG. 1 is a schematic diagram illustrating that a hardware button is applied as a control interface in the prior art.
Figure 2:
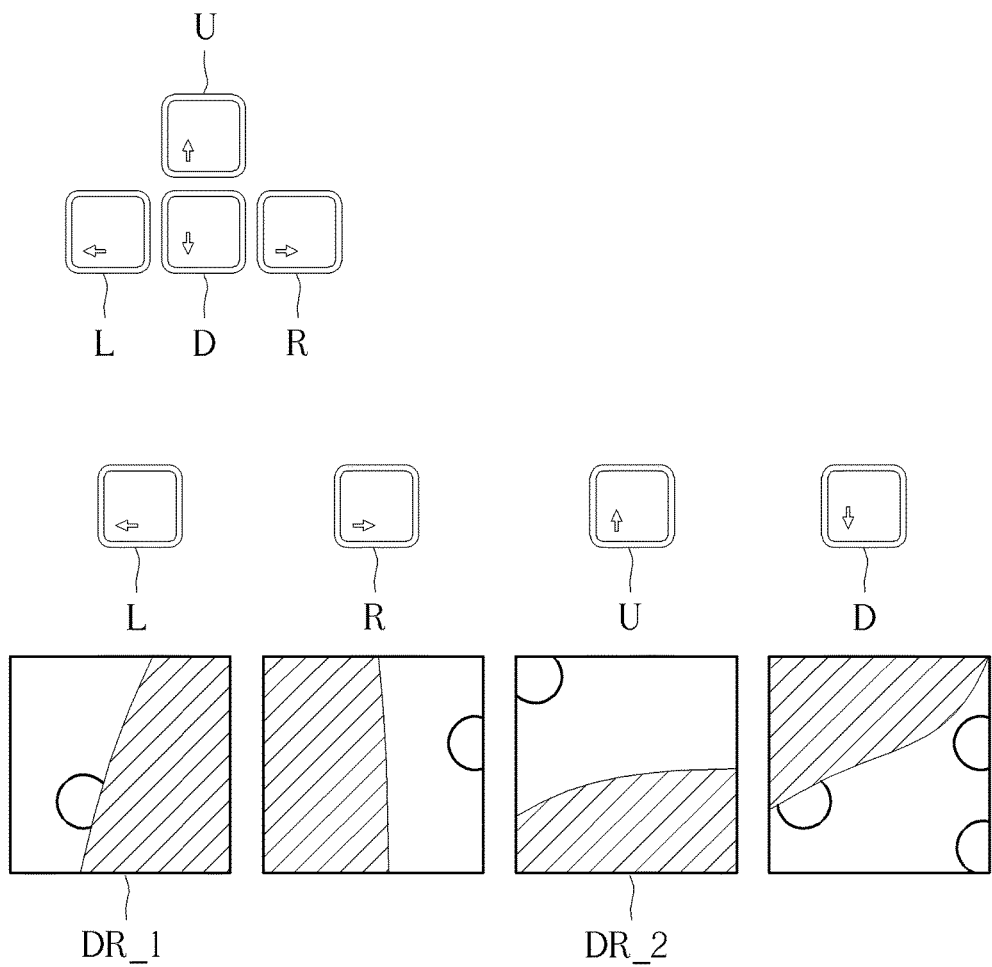
FIG. 2 is a schematic diagram, which illustrates applying a brightness variation direction presented by a plurality of sensing images to determine which direction button is taped, according to one embodiment of the present invention.

FIG. 2 is a schematic diagram, which illustrates applying a brightness variation direction presented by a plurality of sensing images to determine which direction button is taped, according to one embodiment of the present invention. In this embodiment, a plurality of direction keys, such as an up key U, a down key D, a left key L and a right key R are displayed on the electronic apparatus. The sensing images present in a particular manner if the user wants to tap or to long-press any one of the direction keys. For example, the finger always presents a moving operation which is from right to left if the user taps or long-presses the left key L. Accordingly, as illustrated in FIG. 2, the low brightness region DR_1 firstly appears in a right part, and then moves to the left. In another example, if the user taps the up key U, the finger always moves from down to up. Accordingly, as illustrated in FIG. 2, the low brightness region DR_2 firstly appears in a down part, and then moves to the up. In view of above-mentioned descriptions, the embodiment illustrated in FIG. 2 determines which one of the direction keys does the object tap according to the brightness variation direction presented by the sensing images.

Figure 3:
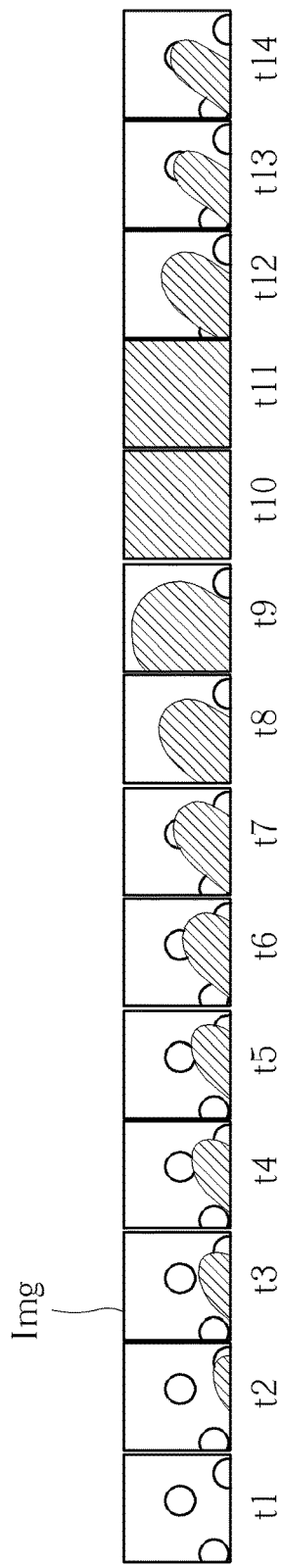
FIG. 3 is a schematic diagram illustrating the brightness variation for a plurality of sensing images while a finger performing a tap operation.

The steps for determining if a continuous tap operation is performed are illustrated in great detail in following descriptions. In following embodiments, an image sensor of the electronic apparatus is applied to capture sensing images, which are applied for determining touch control operations. FIG. 3 is a schematic diagram illustrating the brightness variation for a plurality of sensing images while a finger performing a tap operation. As illustrated in FIG. 3, the finger gradually moves closer to the touch control screen if a tap operation is performed, thus sensing images Img (only one sensing image is marked by a symbol) have a tendency of becoming from bright to dark, for example, the sensing images Img at time points t1-t9. Additionally, the finger blocks the light while touching the touch control screen, thus the sensing images Img are dark images, for example, the sensing images Img at time points t10-t11. Also, if the finger is leaving the touch control screen, the sensing images Img have a tendency of becoming from dark to bright, for example, the sensing images Img at time points t12-t14. In view of the contents of FIG. 3, the tap operation can be determined according to if brightness of the sensing images is higher than a high brightness threshold value or lower than a low threshold value.

Figure 4:
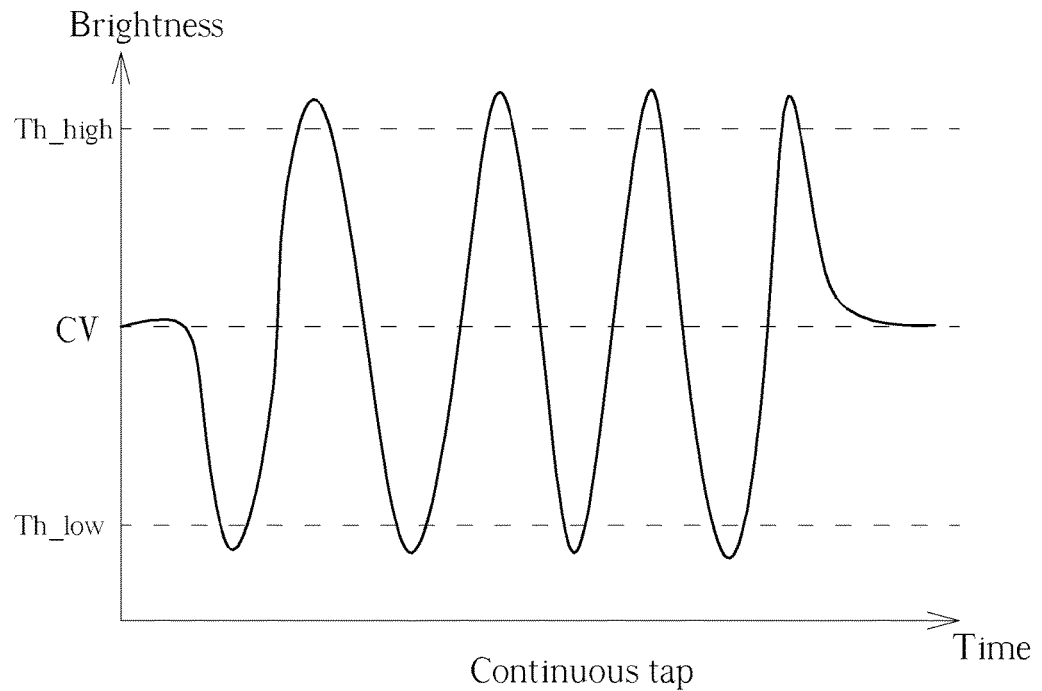
FIG. 4 is a schematic diagram illustrating how to determine if a continuous tap operation occurs according to the brightness presented by a plurality of sensing images.

FIG. 4 is a schematic diagram illustrating how to determine if a continuous tap operation occurs according to the brightness presented by a plurality of sensing images. In view of the content illustrated in FIG. 3, if brightness of the sensing images changes from high to be lower or equals to the low brightness threshold value Th_low, and then becomes to be higher or equal to the high brightness threshold value Th_high, it can be determined that the finger performs a tap operation. Therefore, in the embodiment of FIG. 4, the finger performs four times of taps in a predetermined time interval, thus is regarded as a continuous tap operation having four taps. In view of above-mentioned descriptions, the embodiment in FIG. 4 can be regarded as: it is determined that a continuous tap operation is performed if times for that brightness increases to a high brightness threshold value and decreases to a low brightness threshold value is higher or equal to a continuous tap threshold value in a predetermined time period.

In one embodiment, the brightness of sensing images is converged to a convergence value CV. Therefore, as illustrated in FIG. 4, if no object is closer to the image sensor, the average brightness of sensing images is adjusted to converge at a convergence value CV. By this way, the tap or continuous tap operation can be determined more easily.

Figure 5:
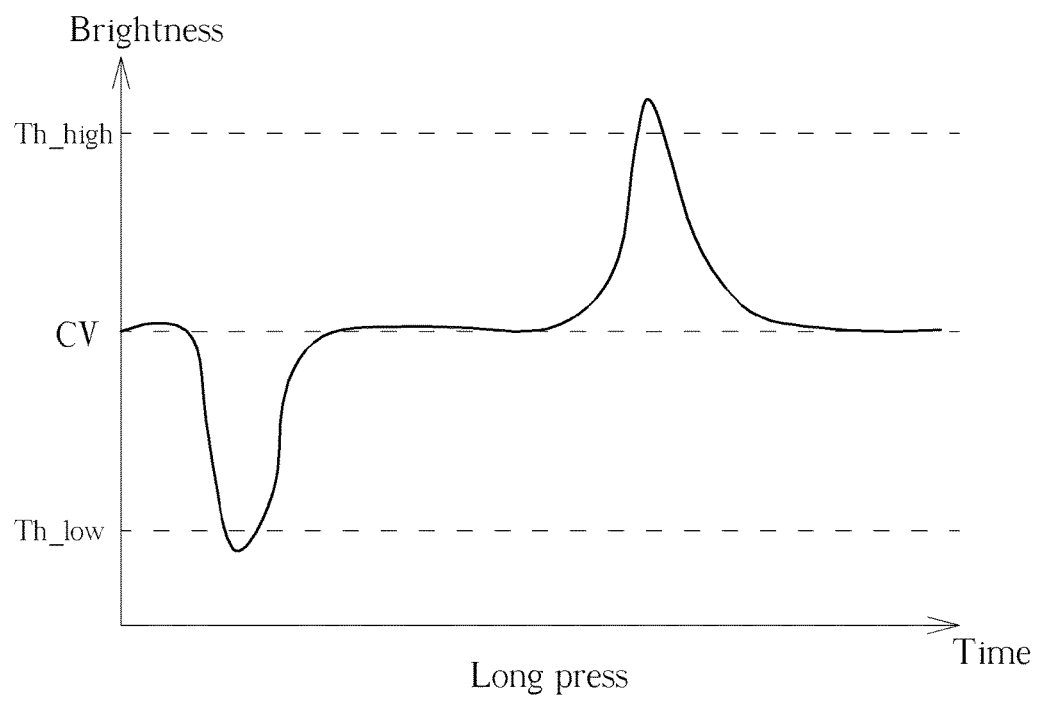
FIG. 5 is a schematic diagram illustrating the brightness variation tendency for a plurality of sensing images while a finger performing a long press operation.
Figure 6:
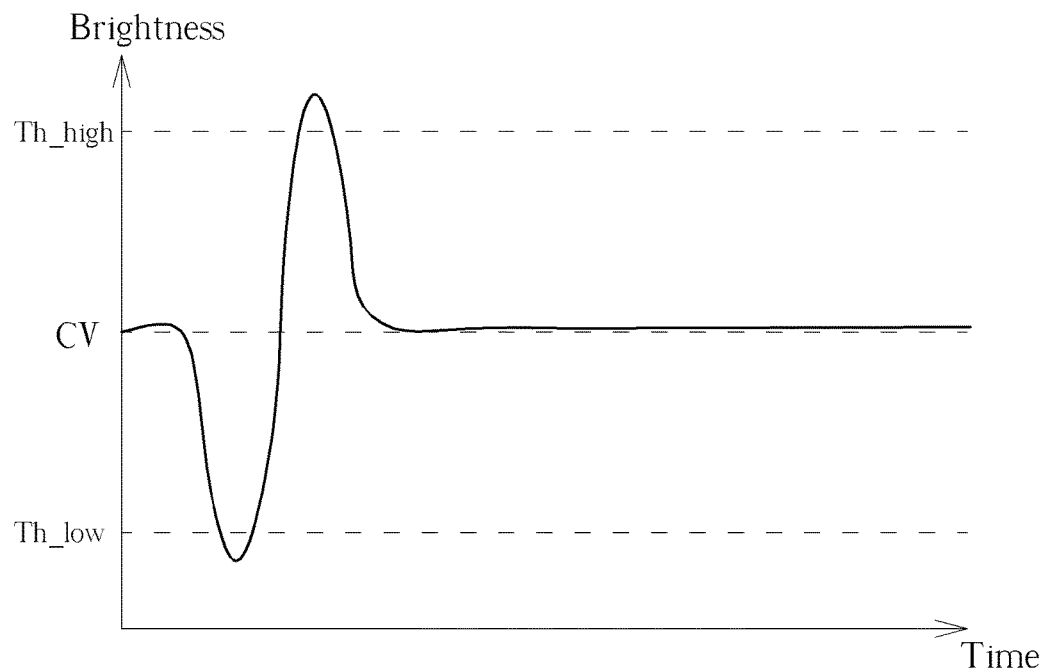
FIG. 6 and FIG. 7 are schematic diagrams illustrating the touch operations that may be wrongly determined as a long press operation.
Figure 7:
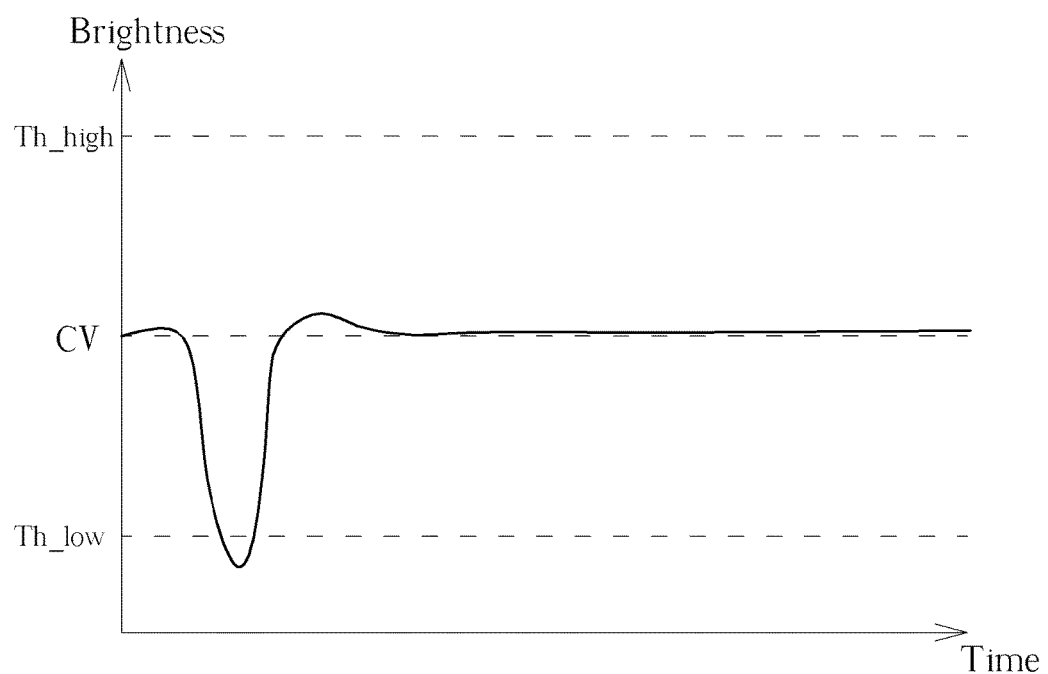

FIG. 5-FIG. 7 are schematic diagrams illustrating how to determine if a long press operation is performed based on the brightness variation tendency presented by sensing images, according to different embodiments of the present invention. A long press operation for the finger comprises: putting down the finger, directly or non-directly pressing the image sensor, and the finger leaves. Based on the description of FIG. 3, it can be understood that the sensing image is a dark image if the finger touches the touch control screen. Therefore, if the finger performs a long press operation, the number for dark sensing images increases. For example, the number for dark sensing images becomes from two to four, six or more if the finger performs a long press operation.

Please refer to FIG. 5, which is a schematic diagram illustrating the brightness variation tendency for a plurality of sensing images while a finger performing a long press operation. As illustrated in FIG. 5, after brightness of the sensing image decreases to be lower or equal to the low brightness threshold value Th_low (i.e. the finger press), the brightness of following sensing images is adjusted to the convergence value CV. Please note, if the brightness of the sensing image is not adjusted, the sensing image is a dark sensing image since the finger blocks the image sensor. The brightness of following sensing images maintains at the convergence value CV for a predetermined time interval (ex. 1 second, but can be other values), and then the brightness of following sensing images increases to the high brightness threshold value Th_high (i.e. the finger leaves). Therefore, the embodiment in FIG. 5 can be summarized as follows: it is determined that the long press operation is performed if the brightness variation tendency is: the brightness decreases to be lower or equal to the low brightness threshold value Th_low and then converges to a convergence value CV, and then increases to be equal to or higher than the high brightness threshold value Th_high, and a time interval that the brightness equals the convergence value CV is satisfied with a predetermined time interval (i.e. higher or equal).

FIG. 6 and FIG. 7 are schematic diagrams illustrating the touch operations that may be wrongly determined as a long press operation. As illustrated in FIG. 6, the brightness of a plurality of sensing images does not converge to the convergence value CV after decreases to be lower or equal to the low brightness threshold value Th_low. On the opposite, the brightness of a plurality of sensing images directly increases to be higher or equal to a high brightness threshold value Th_high. Therefore, the touch control operation may be a tap rather than a long press. Besides, in the example of FIG. 7, the brightness of a plurality of sensing images converges to the convergence value CV rather than increases to be higher or equal to a high brightness threshold value Th_high after decreases to be lower or equal to the low brightness threshold value Th_low. Such situation may be caused by moving the electronic apparatus to a darker place or covering the electronic apparatus via other stuffs, rather than caused by a long press.

Figure 8:
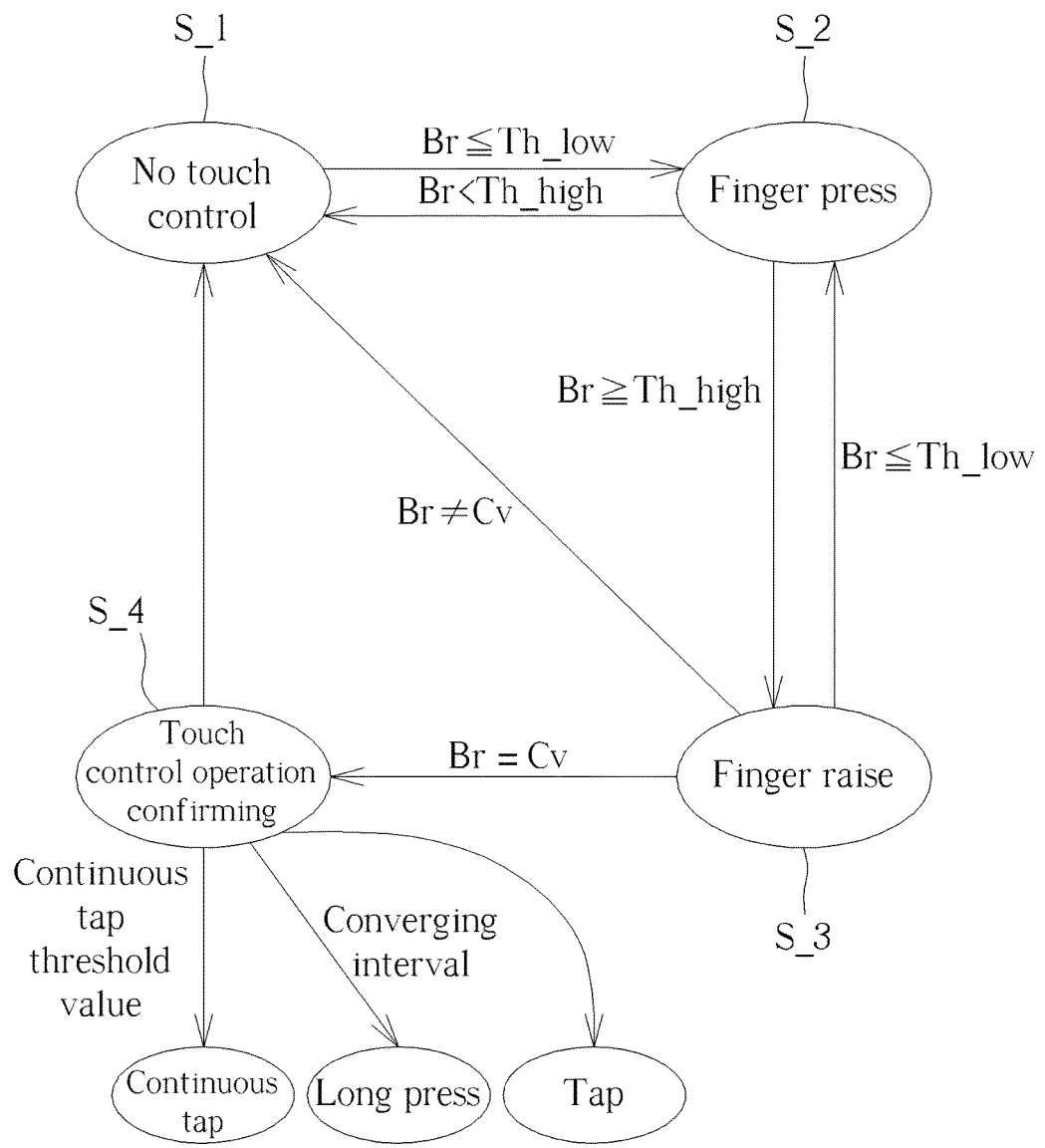
FIG. 8 is a schematic diagram illustrating a state machine, which determines if a predetermined touch control operation is performed based on a brightness variation tendency of sensing images, according to different embodiments of the present invention.

FIG. 8 is a schematic diagram illustrating a state machine, which determines if a predetermined touch control operation is performed based on a brightness variation tendency of sensing images, according to different embodiments of the present invention. As illustrated in FIG. 8, the electronic apparatus may operate in four states: a non touch control state S_1 (ex. the electronic apparatus is put on the table or in the bag), a finger press state S_2 (ex. states t10, t11 in FIG. 3), a finger raise state S_3 (ex. states t12-t14 in FIG. 3) and a touch control operation confirming state S_4. The electronic apparatus is in the non touch control state S_1 if the electronic apparatus is not operated by a user. Also, the state changes to the finger press state S_2 if the brightness Br of the sensing images sensed by the image sensor of the electronic apparatus is lower or equal to the low brightness threshold value Th_low. In the finger press state S_2, if the brightness changes to be higher or equal to the high brightness threshold value Th_high, the state enters the finger raise state S_3. On the opposite, the state goes back to the non touch control state S_1. In the finger raise state S_3, the state enters the touch control operation confirming state S_4 if the brightness Br of the sensing images converges to the convergence value CV. Besides, if the brightness BR gradually decreases to be lower or equal to the low brightness threshold value Th_low, the state goes back to the finger press state S_2.

In the touch control operation confirming state S_4, the touch control operation can be determined based on above-mentioned rules, which means: the brightness Br decreases to be lower or equal to the low brightness threshold value Th_low, and then increases to be higher or equal to the high brightness threshold value Th_high. Also, the touch control operation can be determined based on other factors. For example, if once the following operation illustrated in FIG. 6 occurs: the brightness Br decreases to be lower or equal to the low brightness threshold value Th_low, and then increases to be higher or equal to the high brightness threshold value Th_high, the touch control operation can be determined as a tap operation. If times for the brightness Br decreases to be lower or equal to the low brightness threshold value Th_low, and then increases to the high brightness threshold value Th_high is higher than a continuous tap threshold value (as illustrated in FIG. 4), the touch control operation is determined as a continuous tap operation. Furthermore, the touch control operation is determined as a long press operation if the brightness BR decreases to be lower or equal to the low brightness threshold value Th_low and then converges to a convergence value CV for a predetermined time interval (i.e. a converging interval exists), and then increases to be equal to or higher than the high brightness threshold value Th_high, as illustrated in FIG. 5.

Figure 9:
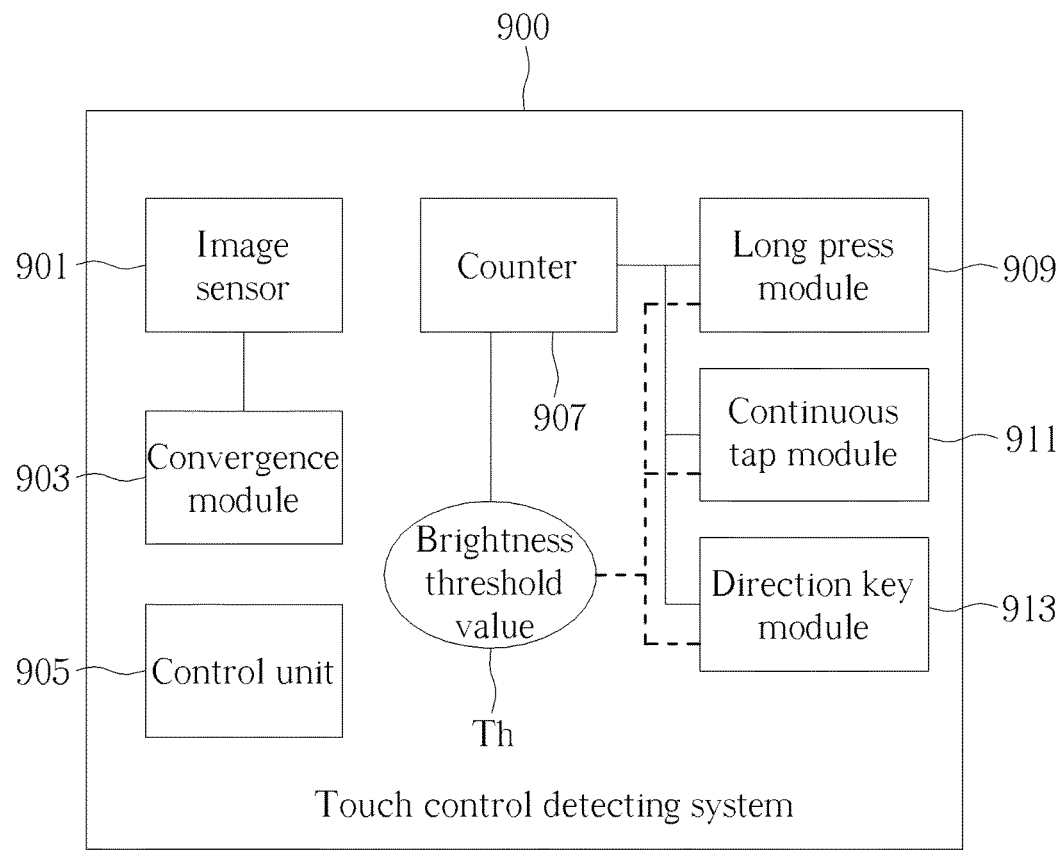
FIG. 9 is a block diagram illustrating a touch control detecting system according to one embodiment of the present invention.

FIG. 9 is a block diagram illustrating a touch control detecting system according to one embodiment of the present invention. As illustrated in FIG. 9, the touch control detecting system 900 comprises: an image sensor 901, a convergence module 903, a control unit 905, a counter 907, a long press module 909, a continuous tap module 911 and a direction key module 913. The image sensor 901 is configured to capture a plurality of sensing images. The convergence module 903 is configured to adjust the brightness for the sensing images captured by the image sensor 901 to the above-mentioned convergence value CV. Many methods can be applied to adjust the brightness of sensing images, for example, adjusting the gain value of the images signals of sensing images. The control unit 905 is configured to control each device. The counter 907 is configured to compute times for that brightness of sensing images is higher or equal to a high brightness threshold value Th_high and is lower than or equal to a low brightness threshold value Th_low according to the threshold value Th, which comprises the high brightness threshold value Th_high and the low brightness threshold value Th_low. The long press module 909, the continuous tap module 911 and the direction key module 913 are respectively configured to determine the above-mentioned long press operation, continuous tap operation and direction key tap operation.

It will be appreciated that the convergence module 903, the long press module 909, the continuous tap module 911 and the direction key module 913 can be implemented by software, and can be integrated to the control unit 905. Additionally, the counter 907 can be integrated to the control unit 905. Therefore, the touch control detecting system can be summarized as: A touch control system, comprising: an image sensor (ex. 901 in FIG. 9), configured to capture a plurality of sensing images; and a control unit (ex. 905 in FIG. 9), configured to determine if an object performs a predetermined touch control operation to a control interface, according to a brightness variation tendency of the sensing images.

In view of above-mentioned embodiments, the sensing images can be applied to determine the touch control operation. Accordingly, the issues due to the capacitive touch control screen or the hard ware button illustrated in prior art can be avoided. Besides, since the present invention determines touch control operation by optical mechanism, the body of the electronic apparatus does not need a hole for a conventional key or a conventional button if the electronic apparatus applies the mechanism provided by the present invention to determine a tap. Accordingly, the disturbance due to the dust or moisture can be avoided.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch control detecting method, applied to an electronic apparatus comprising an image sensor, comprising:
    (a) capturing a plurality of sensing images via the image sensor; and
    (b) determining if an object performs a predetermined touch control operation to the electronic apparatus, according to a brightness variation tendency of the sensing images;
    wherein the predetermined touch control operation is a direction key tap operation.

2. The touch control detecting method of claim 1, wherein the step(b) determines which one of direction keys does the object tap according to a brightness variation direction presented by the sensing images.

3. The touch control detecting method of claim 1, wherein the touch control detecting method is applied to a touch control screen.

4. The touch control detecting method of claim 1, wherein the touch control detecting method is applied to an optical touch control pad.

5. A touch control system, comprising:
    an image sensor, configured to capture a plurality of sensing images; and
    a control unit, configured to determine if an object performs a predetermined touch control operation to a control interface, according to a brightness variation tendency of the sensing images;
    wherein the predetermined touch control operation is a direction key tap operation.

6. The touch control system of claim 5, wherein the control unit determines which one of direction keys does the object tap according to a brightness variation direction presented by the sensing images.

7. The touch control system of claim 5, wherein the control interface is a touch control screen.

8. The touch control system of claim 5, wherein the control interface is an optical touch control pad.

9. A touch control detecting method, applied to an electronic apparatus comprising an image sensor, comprising:
  (a) capturing a plurality of sensing images via the image sensor; and
  (b) determining if an object performs a predetermined touch control operation to the electronic apparatus, according to a brightness variation tendency of the sensing images;
  wherein the predetermined touch control operation is a continuous tap operation.

10. The touch control detecting method of claim 9, wherein the step (b) determines the object performs the continuous tap operation if the brightness variation tendency is: times for that brightness increases to a high brightness threshold value and decreases to a low brightness threshold value is higher or equal to a continuous tap threshold value in a predetermined time period.

11. A touch control system, comprising:
  an image sensor, configured to capture a plurality of sensing images; and
  a control unit, configured to determine if an object performs a predetermined touch control operation to a control interface, according to a brightness variation tendency of the sensing images;
  wherein the predetermined touch control operation is a continuous tap operation.

12. The touch control system of claim 11, wherein the control unit determines the object performs the continuous tap operation to the control interface if the brightness variation tendency is: times for that brightness increases to a high brightness threshold value and decreases to a low brightness threshold value is higher or equal to a continuous tap threshold value in a predetermined time period.

* * * * *